US007441086B2

United States Patent
Chi et al.

(10) Patent No.: US 7,441,086 B2
(45) Date of Patent: Oct. 21, 2008

(54) DATA CACHING METHOD AND COMPUTER-READABLE MEDIUM STORING A PROGRAM EXECUTING THE METHOD

(75) Inventors: Kuang-Hui Chi, Chiayi (TW); Pai-Feng Tsai, Taipei (TW); Kwo-Shine Liaw, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 209 days.

(21) Appl. No.: 11/222,376

(22) Filed: Sep. 7, 2005

(65) Prior Publication Data

US 2007/0022251 A1    Jan. 25, 2007

(30) Foreign Application Priority Data

Jul. 25, 2005    (TW) .............................. 94125066 A

(51) Int. Cl.
*G06F 12/12* (2006.01)
*G06F 9/34* (2006.01)
*G06F 12/02* (2006.01)

(52) U.S. Cl. ........................ 711/133; 711/134; 711/167
(58) Field of Classification Search ........................ None
See application file for complete search history.

(56) References Cited

U.S. PATENT DOCUMENTS

| 5,226,141 | A  | * | 7/1993 | Esbensen ..................... 711/171 |
| 6,209,062 | B1 | * | 3/2001 | Boland et al. ............... 711/134 |
| 6,263,369 | B1 | * | 7/2001 | Sitaraman et al. ........... 709/225 |
| 6,785,770 | B2 |   | 8/2004 | Hoogerbrugge et al. ..... 711/133 |
| 2002/0052781 | A1 | * | 5/2002 | Aufricht et al. ............... 705/14 |
| 2002/0078300 | A1 |   | 6/2002 | Dharap ....................... 711/133 |
| 2004/0128459 | A1 | * | 7/2004 | Chanda et al. .............. 711/167 |

* cited by examiner

*Primary Examiner*—Gary J Portka
*Assistant Examiner*—Duc T Doan
(74) *Attorney, Agent, or Firm*—J.C. Patents

(57) ABSTRACT

A data caching method and a computer-readable medium storing a program executing the method used in a cache system where a data replacing parameter is used for a data replacement rule, are provided to assist determining whether a user data has to be replaced or not. The data caching method and the program rely on the cache system to determine whether to replace the user data when the resource consumed in fetching the user data is lower than a predetermined level. However, when the resource consumed in fetching the user data is higher or equal to the predetermined level, the value of the data replacing parameter mentioned above is replaced within a predetermined period, such that the user data could be maintained in the cache system.

9 Claims, 2 Drawing Sheets

Figure 1:
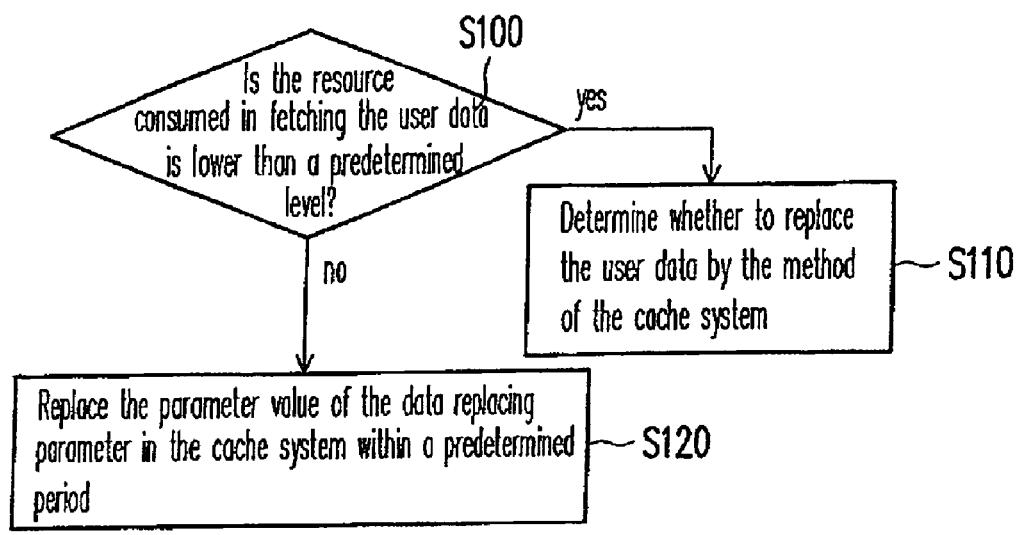

```
var Q: set of (id,time);
Upon detecting a new addition of MS_i's context into the cache:
    if (λ_i > Λ)  then  Q := Q ∪ {(i,CLOCK + exp n((t_i − 1)λ_i)}
Upon detecting MS_i's arrival, eviction or invalidation of MS_i's context in the cache:
    Q := Q − {(i,time_i)}
Upon detecting timeout of the head element, say (i,time_i), from Q:
    begin
        generate a reference request for MS_i's context to the cache;
        time_i := CLOCK + exp n((t_i − 1)λ_i);
        re-order the position of (i,time_i) in Q
    end
```

FIG. 3

```
var Q: set of (id,time);
Upon detecting a new addition of MS_i's context into the cache:
    if (λ_i > Λ)  then  Q := Q ∪ {(i,CLOCK + exp n((t_i − 1)λ_i)}
Upon detecting the eviction or invalidation of MS_i's context in the cache:
    Q := Q − {(i,time_i)}
Upon detecting timeout of the head element, say (i,time_i), from Q:
    begin
        generate a reference request for MS_i's context to the cache;
        time_i := CLOCK + exp n((t_i − 1)λ_i);    re-order the position of (i,time_i) in Q
    end
```

FIG. 4

DATA CACHING METHOD AND COMPUTER-READABLE MEDIUM STORING A PROGRAM EXECUTING THE METHOD

CROSS-REFERENCE TO RELATED APPLICATION

This application claims the priority benefit of Taiwan application serial no. 94125066, filed on Jul. 25, 2005. All disclosure of the Taiwan application is incorporated herein by reference.

BACKGROUND OF THE INVENTION

1. Field of the Invention

The present invention relates to a data processing method, and more particularly, to a data caching method and a computer-readable medium storing a program executing the method.

2. Description of the Related Art

It is an important subject of how to obtain optimum efficiency of data processing in the real world where the data are frequently exchanged.

The data storing operation is an indispensable step during data processing. According to the different locations of the storage devices in the current data storage systems, the data storage system is roughly classified into two types: the network storage device and the single storage device. In the single storage device, based on the different access rates, the data storage device may be classified as the optical disc, the general memory, and the cache memory. Under the premise of the same capacity, the higher the access rate, the higher the cost of the storage device. Accordingly, if the optimum processing speed is obtained with the lowest cost, the efficiency of the data processing is undoubtedly improved.

In order to improve the data processing efficiency, many studies on the data processing in the cache memory had been made in the prior art. For example, different methods for replacing data in the cache memory had been disclosed in the U.S. Pat. No. 6,785,770 and US Patent Application No. 20020078300, respectively. However, the method for replacing data in the cache memory are mainly based on two different rules, they are the Least-Recently Used (LRU) rule and the Lease-Frequently Used (LFU) rule. Wherein, the LRU rule relies on the number of data usage to determine whether to delete the data from the cache memory, and the LFU rule relies on the frequency of data usage to determine whether to delete data from the cache memory.

However, the data processing rules mentioned above only consider the performance of the data processing rather than considering the resource consumed in fetching the data (including the consumed resource such as the time cost, the space cost, and the priority level, etc.). For example, once data, which is less frequently used but takes multiplied time to fetch when compared with other data, had been deleted from the cache memory, the time cost consumed in fetching the data again from the cache memory is multiple of that for fetching other data. Consequently, if the resource consumed in fetching the data is not accounted for, the efficiency of data processing is hard to improve.

In the patent and patent application mentioned above, some technology dose take the resource consumed in fetching the data into consideration, and also converts this concept to the actual data replacing structure. Although such invention is not so bad, it cannot be applied on the conventional cache system structure without changing it.

SUMMARY OF THE INVENTION

Therefore, it is an object of the present invention to provide a data caching method, which can use the resource consumed in fetching the data as one of the factors for determining the data replacing parameter in the conventional cache system.

It is another object of the present invention to provide a computer-readable medium storing a program executing a method for data caching, which can further consider the impact due to the resource consumed in fetching the data without modifying the data replacing structure in the conventional cache system, such that the flexibility of replacing the data is improved.

The present invention provides a data caching method used in a cache system where a data replacing parameter is used for a data replacement rule to assist determining whether a user data has to be replaced or not. The data caching method and the computer program rely on the cache system to determine whether to replace the user data when the resource consumed in fetching the user data is lower than a predetermined level. However, when the resource consumed in fetching the user data is higher or equal to the predetermined level, the value of the data replacing parameter mentioned above is replaced within a predetermined period, such that the user data could be maintained in the cache system.

In an embodiment of the present invention, the data replacing rule of the cache system mentioned above is the Least-Recently Used (LRU) rule, and the data replacing parameter is the number of data usage.

In another embodiment of the present invention, the data replacing rule of the cache system mentioned above is the Least-Frequently Used (LFU) rule, and the data replacing parameter is the frequency of data usage.

In another embodiment of the present invention, in addition to obtaining the resource consumed in fetching the user data mentioned above, whether to replace the parameter value of the data replacing parameter in the predetermined period further relies on the service level of the user data.

In another embodiment of the present invention, the cache system mentioned above is used in a signal access point (AP) of a wireless network, and the user data contains the corresponding login information obtained from a server by the signal access point (AP) of the wireless network when the user login to the signal access point (AP) of the wireless network. Wherein, the resource consumed in fetching the user data is a period of time from when the signal access point (AP) of the wireless network starts to request the login information from the server to when the signal access point (AP) of the wireless network had received the login information.

The present invention further provides a computer-readable medium storing a program executing a method for data caching. Wherein, when the computer program is operating, first it determines the resource consumed in fetching the user data, and it does not perform any step if the source consumed in fetching the user data is lower than a predetermined level. Otherwise, if the source consumed in fetching the user data is higher than or equal to the predetermined level, the parameter value of the data replacing parameter is replaced within a predetermined period. Wherein, the data replacing parameter is used by the cache system to determine whether to replace the user data.

In an embodiment of the present invention, the computer program mentioned above operates in the computer as a resident program.

In an embodiment of the present invention, the data replacing rule of the cache system mentioned above is the Least-Recently Used (LRU) rule, and the data replacing parameter is the number of data usage.

In another embodiment of the present invention, the data replacing rule of the cache system mentioned above is the Least-Frequently Used (LFU) rule, and the data replacing parameter is the frequency of data usage.

In summary, since in the present invention, the object of temporarily maintaining the data in the cache system is achieved by modifying the parameter for determining whether to replace the user data, it is possible to consider the impact of the resource consumed in fetching the user data on the data processing without modifying the original cache system structure, such that the flexibility of data replacement is improved.

BRIEF DESCRIPTION DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 1 schematically shows a flow chart of a method for data caching according to an embodiment of the present invention.

Figure 2:
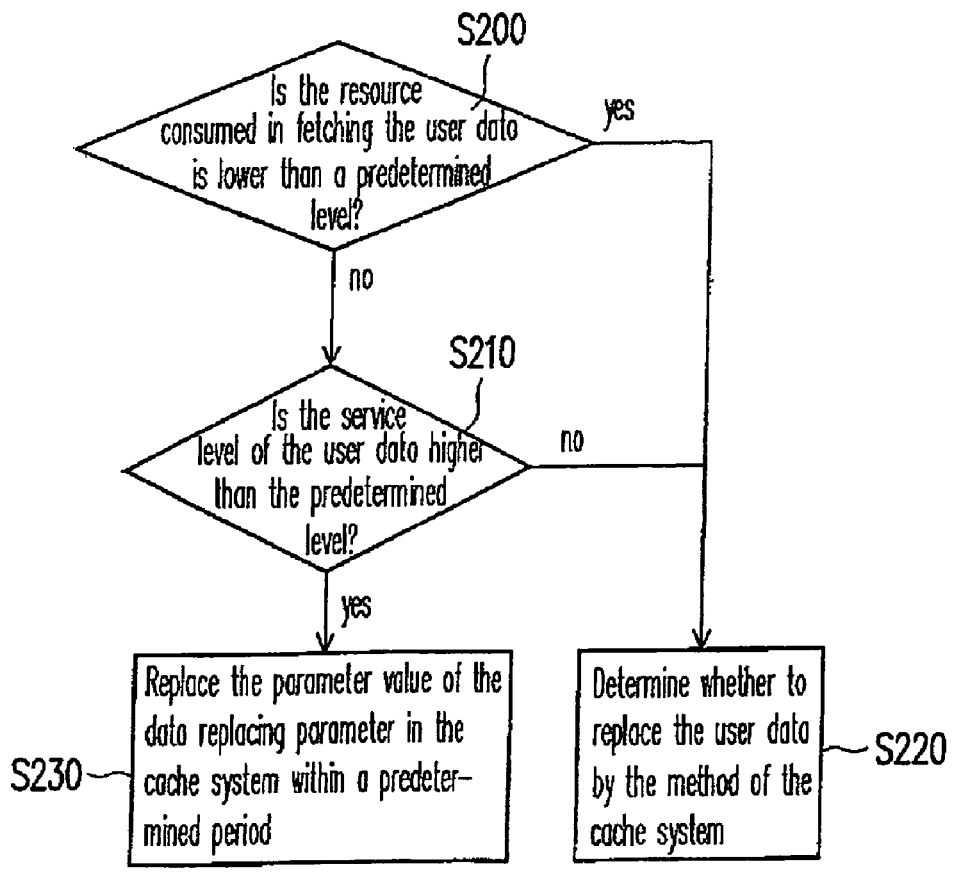

FIG. 2 schematically shows a flow chart of a method for data caching according to another embodiment of the present invention.

FIG. 3 schematically shows a pseudo code of the computer program when determining to issue a pseudo access signal according to an embodiment of the present invention.

FIG. 4 schematically shows a pseudo code of the computer program when determining to issue a pseudo access signal according to another embodiment of the present invention.

DESCRIPTION OF THE EMBODIMENTS

FIG. 1 schematically shows a flow chart of a method for data caching according to an embodiment of the present invention. The flow chart is applied on a cache system having a self-defined data replacing rule, and the data replacing rule uses some specific data replacing parameters to determine whether to replace the data. For example, when the Least-Recently Used (LRU) rule is used by the cache system, the data replacing parameter is the number of data usage, and when the Least-Frequently Used (LFU) rule is used by the cache system, the data replacing parameter is the frequency of data usage.

In the present embodiment, first, the relationship between the resource consumed in fetching the user data and a predetermined level is determined (step S100). Wherein, the consumed resource may be a time consumed in fetching the user data or may be a cost consumed for any other possible reasons. If it is determined in step S100 that the consumed resource is lower than the predetermined level, whether to replace the user data is determined according to the data replacing rule self-defined by the cache system (step S110). Otherwise, if it is determined in step S100 that the consumed resource is greater than or equal to the predetermined level, the parameter value of the data replacing parameter mentioned above is replaced within a predetermined period, such that the user data can be maintained in the cache system during the predetermined period (step S120).

In addition to the resource consumed in fetching the user data, whether to maintain the user data in the cache memory further relies on a service level of the user data. FIG. 2 schematically shows a flow chart of a method for data caching according to another embodiment of the present invention. In the present embodiment, similarly, first, the relationship between the resource consumed in fetching the user data and a predetermined level is determined (step S200). If it is determined in step S200 that the consumed resource is lower than the predetermined level, whether to replace the user data is determined according to the data replacing rule self-defined by the cache system (step S220). Otherwise, if it is determined in step S200 that the consumed resource is greater than or equal to the predetermined level, whether to replace the parameter value of the data replacing parameter is further determined according to whether the service level is higher than the predetermined level (step S210). If the service level is too low, the process goes to step S220 to determine whether to replace the user data according to the data replacing rule self-defined by the cache system. Otherwise, if the service level is high enough, the parameter value of the data replacing parameter mentioned above is replaced within a predetermined period, such that the user data can be maintained in the cache system during the predetermined period (step S230).

Note that even the order of the determining steps S200 and S210 mentioned above are switched over, the effect similar to the previous two embodiments still can be achieved.

If the method mentioned above is implemented as a computer program, the computer program caim be applied on various cache environments. A case of applying the computer program on the wireless network environment is exemplified hereinafter for describing the present embodiment. For an easy explanation, only one signal access point (AP) of the wireless network is exemplified herein. In addition, it is assumed that the communication from the user side mobile station (MS) to the AP is treated as one communication session, and the interval between each communication session has an index-type distribution of an average value of $1/\lambda_i$. In addition, it is also assumed that the content of $MS_i$ is not deleted from the cache memory immediately, in other words, before the content of $MS_i$ is deleted by the data replacing rule (presumably LRU rule) of the cache system, the content of $MS_j$ is continuously maintained in the cache memory.

In order to make good use of the cache memory and to provide a better efficiency for the entire system operation, the design object of the present invention is to reduce the cache miss cansed by the contents consuming large resource. Accordingly, when it is determined that the resource consumed in fetching the user data is lower than the predetermined level, whether to replace the user data is determined according to the data replacing rule self-defined by the cache system. Otherwise, if it is determined that the resource consumed in fetching the user data is higher or equal to the predetermined level, the parameter value of the data replacing parameter mentioned above is replaced within a predetermined period, such that the user data could be maintained in the cache system during the predetermined period.

In order to maintain the user data in the cache system during the predetermined period and not to modify the original cache system structure, some special operations are required. In the present embodiment, the object mentioned above is achieved by using the data collected from the AP.

Typically, two types of data can be collected from the AP: $t_i$ and $\lambda_i$. Wherein, $t_i$ represents an average delay time for $MS_i$ to complete an entire IEEE 802.1x standard login process. The standard login process means the entire process from the moment when the $MS_i$ successfully registers in the wireless network to the moment when the $MS_i$ obtains the access right of the wireless network. In the standard loam process, the AP fetches the user data from a backend login server and then checks the correctness of the user data. The standard login process is completed when the correctness of the user data is confirmed (i.e. the resource consumed in fetching the user data is one part of the entire login process). The user data is the basic profile information of the user, also known as subscriber data. For example, the user data may include data items such as login name, password, privilege levels, time limit of the subscription, address, telephone number, name, and birth date of the user. These data items may also be included in the login information of the user. The user data and/or the login information may be provided by the login server mentioned above. This login server may be a database which stores the user data of all users (i.e. subscribers) of the wireless network. This login server may be provided by the information service provider (ISP) which operates the wireless network service. According to $t_i$ and $\lambda_i$ collected by the AP, the cache memory in the AP may be configured as a table related to the MS. A possible configuration is that the content of the $MS_i$ includes i, $context_1$, $d_i$, $t_{i,n}$, $r_i$, and $a_{i,p}$, wherein i represents a specific user side mobile station (MS) corresponding to the content; $context_i$ represents the information content defined by the IEEE 802.11 standard and transmitted in the roaming of the $MS_i$ from the present AP to another nearby AP, wherein the present AP means the AP which the $MS_j$ is currently communicating with; $d_i$ represents the latest login delay time of the present MS recognized by the AP; $t_{i,n}$ represents the average delay of the previous n times login ($t_{i,n} = \alpha d_i + (1-\alpha)t_{i,n-1}$, where $0 \leq \alpha \leq 1$); $r_i$ represents the interval between the latest communication sessions; and $a_{i,p}$ represents the average interval for the previous p times of communication sessions ($a_{i,p} = \beta r_i + (1-\beta)a_{i,p-1}$, where $0 \leq \beta 1$). It is practical to use such derived $t_{i,n}$, indicative of $t_i$ in question. It is also noted that equations for calculating $t_{i,n}$ and $a_{i,p}$ are reflective of exponential averaging techniques, which are robust enough to expressing moving averages of statistics. Parameters $\alpha$ and $\beta$ are referred to as weight factors in some literature, controlling the relative use of the most recent statistical data and past history. Here, $\lambda_i = 1/a_{i,p}$, and the content of other items may be configured as an arbitrary value during the initialization or acquired from other means using, for example, the Simple Network Management Protocol.

FIG. 3 schematically shows a pseudo code of the computer program when determining to issue a pseudo access signal based on the parameters $t_i$ and $\lambda_i$ mentioned above according to an embodiment of the present invention. Here $\lambda_i$ is the hypothetical frequency of the MS logging into the wireless network. The pseudo access signal is transmitted from the AP to the login server in order to simulate the login of the MS without actual MS login. The pseudo access signal keeps the user data in a frequently-accessed state so that the user data can stay in the cache without being replaced. At the beginning of the login process, the MS transmits data input by the user, such as login id and password, to the AP. Upon receiving these data, the AP checks whether it has the corresponding user data of the user. If the AP does not have the user data, the AP transmits an access signal to the login server to fetch the corresponding user data in order to complete the authentication of the user. The resource consumed in fetching the user data is the time spent by the MS on waiting for the completion of the authentication when the AP does not have the user data and has to fetch the user data from the login server. In the present embodiment, first, a list Q is configured, wherein the list Q is formed by multiple sets of data, and each set of data contains two contents: the user data identifier (id) and the due time (time). Whenever it is detected that one content to be transmitted by the MS to the AP for the next login had been input into the cache memory by the AP and it is also determined that $\lambda_i$ of MS is greater than a predetermined value ($\Lambda$), the corresponding content is added into the list Q. The aforementioned one content to be transmitted by the MS is the data input by the user, such as login id and password, that the MS transmits to the AP in the login process. The user data are stored in both the cache and the list Q. The list Q is only used to simulate the LRU algorithm. The list Q is not accessed by any component of the wireless network. If the communication session corresponding to the content recorded in the list Q is detected, or the content in the corresponding cache memory is deleted or replaced, the corresponding content recorded in the list Q is deleted. Furthermore, every time the MS logins into the wireless network, the MS acQuires a limited time period to access the wireless network. The length of the time period of access may be predetermined by the ISP. When the time period expires, the MS has to login again. This mechanism of repeated login is designed for network security. Consequently, when the time period is due, a signal for accessing the MS content in the cache memory is actively generated by the computer program, and the due time and the sequence number of the MS in the list Q are both modified. Accordingly, the sequence for replacing the contents in the cache memory can be adjusted without having to modify the original cache system.

For example, after multiple accesses by the AP on the behalf of the MS to extract the MS contents in the cache memory of the AP, a list Q may be obtained as follows:

$Q=\{(i, 200), (j, 234), (k, 252), \ldots\}$.

As shown above, a signal for accessing the $MS_i$ is issued by the computer program at the time 200, and the list Q is rearranged after an arbitrary value had been added to the time 200. Assuming that the time 200 is changed to 248 after an arbitrary value is added, the rearranged list Q becomes:

$Q=\{(j, 234), (i, 248), (k, 252), \ldots\}$

By applying the same for others, similarly, when the time is 234, the computer program issues a signal for accessing the MS contents in the cache memory.

In addition, in order to improve the processing speed for adapting with the fast moving mobile environment, the pseudo code shown in FIG. 4 may be used to perform the operation of issuing the pseudo accessing signal mentioned above. As shown in FIG. 4, it is different from FIG. 3 in that the communication session corresponding to the content recorded in the list Q is not considered in the embodiment of FIG. 4. However, in the fast moving mobile environment, the login or logout operations of a certain wireless network area can be very frequent. With the method shown in FIG. 4, the impact on the cache system due to the login and logout operations can be effectively eliminated.

In summary, in the present invention, the object of temporarily maintaining the user data in the cache system is achieved by modifying the parameter used for determining whether to replace the user data. Accordingly, without modifying the original cache system structure, the resource consumed in fetching the user data is further considered, such that the flexibility of data replacement is improved.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A data caching method, adapted for a cache system where a data replacing parameter is used for a data replacement rule to assist determining whether to replace a user data; the data caching method comprising:

when a resource consumed in fetching the user data is lower than a predetermined level, determining whether to replace the user data by the cache system; and when the resource consumed in fetching the user data is greater than or equal to the predetermined level, replacing a parameter value of the data replacing parameter within a predetermined period, such that the user data is maintained in the cache system during the predetermined period;

wherein:

the cache system is used in a signal access point (AP) of a wireless network, the user data comprises a corresponding login information obtained from a server by the signal access point (AP) of the wireless network when a user login to the signal access point (AP) of the wireless network, and the resource consumed in fetching the user data is a period of time from when the signal access point (AP) of the wireless network starts to request the login information from the server to when the signal access point (AP) of the wireless network receives the login information.

2. The data caching method of claim 1, wherein the data replacing rule of the cache system is a Least-Recently Used (LRU) rule, and the data replacing parameter is a number of data usage.

3. The data caching method of claim 1, wherein the data replacing rule of the cache system is a Least-Frequently Used (LFU) rule, and the data replacing parameter is a frequency of data usage.

4. The data caching method of claim 1, wherein whether to replace the parameter value of the data replacing parameter within the predetermined period is further determined according to a service level of the user data.

5. A computer-readable medium storing a program, the program executing a method for data caching in the computer, the method comprising:

determining a resource consumed in fetching a user data; and when the resource consumed in fetching the user data is greater than or equal to a predetermined level, replacing a parameter value of a data replacing parameter within a predetermined period, wherein:

a cache system relies on the data replacing parameter to determine whether to replace the user data, the cache system is used in a signal access point (AP) of a wireless network, the user data comprises a corresponding login information obtained from a server by the signal access point (AP) of the wireless network when a user login to the signal access point (AP) of the wireless network, and the resource consumed in fetching the user data is a period of time from when the signal access point (AP) of the wireless network starts to request the login information from the server to when the signal access point (AP) of the wireless network receives the login information.

6. The computer-readable medium of claim 5, wherein the program operates in the computer as a resident program.

7. The computer-readable medium of claim 6, wherein the data replacing rule of the cache system is a Least-Recently Used (LRU) rule, and the data replacing parameter is a number of data usage.

8. The computer-readable medium of claim 5, wherein the data replacing rule of the cache system is a Least-Frequently Used (LFU) rule, and the data replacing parameter is a frequency of data usage.

9. The computer-readable medium of claim 5, wherein the method further comprises:

determining whether to replace the parameter value of the data replacing parameter within the predetermined period according to a service level of the user data.

* * * * *